(12) United States Patent
Lavenuta

(10) Patent No.: US 6,660,554 B2
(45) Date of Patent: Dec. 9, 2003

(54) THERMISTOR AND METHOD OF MANUFACTURE

(76) Inventor: Gregg J. Lavenuta, 1210 Starview Dr., Vista, CA (US) 92084

(*) Notice: Subject to any disclaimer, the term of this patent is extended or adjusted under 35 U.S.C. 154(b) by 19 days.

(21) Appl. No.: 10/013,557

(22) Filed: Dec. 11, 2001

(65) Prior Publication Data

US 2002/0101327 A1 Aug. 1, 2002

Related U.S. Application Data

(62) Division of application No. 09/770,566, filed on Jan. 26, 2001, now Pat. No. 6,498,561.

(51) Int. Cl.⁷ .......... H01L 21/00; H01L 21/20; H01C 1/012; H01C 1/14
(52) U.S. Cl. .......... 438/54; 438/382; 338/309; 338/324
(58) Field of Search .......... 438/54, 55, 382, 438/384, 385; 338/22, 314, 322, 309

(56) References Cited

U.S. PATENT DOCUMENTS

| | | | |
|---|---|---|---|
| 3,645,785 A | * | 2/1972 | Hentzschel ............ 428/620 |
| 3,815,074 A | | 6/1974 | Nagata et al. |
| 3,820,239 A | | 6/1974 | Nagata et al. |
| 4,712,085 A | | 12/1987 | Miki et al. |
| 4,758,814 A | | 7/1988 | Howng et al. |
| 5,339,068 A | | 8/1994 | Tsunoda et al. |
| 6,008,717 A | | 12/1999 | Kawase et al. |
| 6,119,529 A | | 9/2000 | Di Marco et al. |
| 6,147,589 A | | 11/2000 | Ohmura |
| 6,164,819 A | | 12/2000 | Moriwake et al. |
| 6,172,592 B1 | | 1/2001 | Inoue et al. |
| 6,371,684 B2 | * | 4/2002 | Giesenberg et al. ........ 403/338 |

FOREIGN PATENT DOCUMENTS

| | | | |
|---|---|---|---|
| DE | 3900787 | | 1/1989 |
| JP | 03136204 | | 6/1991 |
| JP | 404078101 A | * | 3/1992 |
| JP | 05234705 A | * | 9/1993 |
| JP | 2000021606 A | * | 1/2000 |
| JP | 02000021606 A | * | 1/2000 |
| JP | 02002203703 A | * | 7/2002 |

OTHER PUBLICATIONS

Lavenuta, G.; "Negative Temperature Coefficient Thermistors", J. of Applied Sensing Technology, 14(5), May 1997, pp. 1–11.

* cited by examiner

*Primary Examiner*—John F. Niebling
*Assistant Examiner*—Viktor Simkovic
(74) *Attorney, Agent, or Firm*—Hedman & Costigan, P.C.

(57) ABSTRACT

A thermistor having multiple metal layers about at least a portion of a semiconductor body. The thermistor includes a first thick film electrode layer, a reactive metal layer, a barrier metal layer and, optionally, a layer to facilitate attachment to an electrical contact. Also, a method of making the thermistor is described.

10 Claims, 6 Drawing Sheets

THERMISTOR AND METHOD OF MANUFACTURE

The present application is a divisional of and claims priority to U.S. application Ser. No. 09/770,566 filed Jan. 26, 2001 U.S. Pat. No. 6,498,561.

BACKGROUND OF THE INVENTION

1. Field of the Invention

This invention is directed to a thermistor for temperature measurement, control and/or temperature compensation and a method of making the same. More particularly, the invention is directed to a thermistor having multiple layers of electrode metal.

2. Background of the Invention

Thermistors (thermally sensitive resistors), are ceramic semiconductors which exhibit large changes in electrical resistance with corresponding changes in temperature. Because of their sensitivity, accuracy, and stability, thermistors are generally accepted to be the most advantageous sensor for many applications including temperature measurement, compensation, and control. Thermistors are used extensively for commercial consumer electronic products, automotive, industrial, and medical electronic applications, food handling and processing, communication and instrumentation, computers, military and aerospace, and research and development. Some practical uses of thermistors include liquid level measurement, photography, thermometers, intravenous catheters, blood analysis, myocardial needle probes, automotive climate control, fuel level/temperature, temperature sensors for household appliances such as air conditioners, coffee makers, and data logger applications such as air, soil, liquid temperature probes. Their use in portable phones, carphones, quartz oscillators and transceivers continues to expand.

The most important characteristics of thermistors are an extremely high temperature coefficient of resistance and precise resistance versus temperature characteristics. The sensitivity to temperature change can result in a thermistor resistance change of 10 million to one over an operating temperature range. Prior art chip thermistors are of small size, square configuration, are available coated or uncoated, in leaded or unleaded embodiments, having operating temperature ranges of −80° C. to 300° C., and resistance ranges from 0.5 ohms to 40 megohms.

The electrical resistivity of a positive temperature coefficient (PTC) thermistor increases with increase in temperature. PTC thermistors switch from a low resistance to a high resistance state at a specific temperature. They are widely used as current limiters from −80° C. to 300° C., 0.5 ohms to 40 megohms. Conversely, the electrical resistivity of a negative temperature coefficient (NTC) thermistor decreases with increase in temperature. NTC thermistors are used to sense temperatures from −80° C. to 300° C. with nominal resistance at 25° C. from 0.5 ohms to 40 megohms. Therefore, they have a large temperature coefficient of resistance and a wide range of resistance values. They are also available in a wide range of sizes from 3 mm in diameter to 22 mm in diameter in adaptable shapes and sizes for a wide variety of mechanical environments. Typical applications for NTC thermistors include fan control, temperature sensing, circuit protection and temperature control. NTC thermistors are chosen when remote sensing is required, small size is desired, or where small temperature differences need to be measured.

NTC thermistors used for temperature measurement and compensation are usually made from various compositions including the oxides of manganese, nickel, cobalt, copper, iron, and other metals to form a ceramic semiconductor material.

Thermistors may be formed into different shapes of bead, disc, rod, chip or flake configuration. The flake style thermistor is simply a much smaller size version of the chip thermistor. Wafer thermistors are produced by forming thin sheets of material including powders of the oxides of manganese, nickel, and other oxides combined in a binder. The material is sintered at elevated temperatures, coated with a conductive metal composition, and then diced to size. Leads are attached by soldering. The units are finally coated in an epoxy or other electrical insulation material for final protection and stabilization. A typical prior art thermistor element, shown in FIG. 1, represents a chip type thermistor composed of sintered powders of metal oxides (1) on which electrodes (2) and (3) are deposited.

Specifically, when the prior art thermistors with thick film electrodes made with Ag, PdAg or Au are attached to substrates (surface mount configurations, FIG. 1) or to leads (discrete component configurations, FIG. 2) with high temperature solders using processes operating between 200° C. and 380° C. at dwell times ranging from 5 seconds to 3 minutes, their electrical resistance shifts outside the allowable specified resistance tolerance (typically 2–5%). This results in a defective or deficient final product or subassembly into which the thermistor is assembled.

These resistance shifts of the prior art thermistors have now been found to be caused by a phenomenon called leaching, which occurs during the soldering process. Leaching occurs because the metal in the electrode has a higher affinity for the molten solder than its bond with glass frit or fritless binder of the electrode. As the thermistor electrode is being soldered, the metal is released from its bond with the glass frit or fritless binder of the electrode and is absorbed into the molten solder. As a result, the electrical resistance of the thermistor increases from its original value, prior to the soldering process. In other words, the metal element forming the external electrodes will be compromised due to the solder leaching.

The rate of leaching of the thermistor thick film electrode is dependent on the type of electrode material and the temperature and the duration of the soldering process to which the thermistor is exposed. Typically, exposing thermistors of the prior art to molten solder at temperatures above 200° C. for extended periods of time (greater than 5 seconds) is not recommended by thick film electrode manufacturers since degradation of the electrode increases more rapidly above this temperature and beyond this time. In addition to the shift in electrical resistance, leaching causes degradation of the solder-electrode and electrode-semiconductor bond. Weakened bonds may result in thermistors having greatly reduced stability and reliability.

Thick film Pt electrodes have been found to be resistant to leaching compared to other electrode materials. However, the high cost of thick film Pt electrodes renders the prior art thermistor not cost effective to manufacture. Also, it is more difficult to bond Au wire to thick film Pt electrodes using the thermo-sonic or equivalent wire ball bonding process.

In addition, prior art thermistors with thick film Ag or PdAg electrodes are not commonly used in hybrid microcircuit applications requiring 0.001" OD gold wire (or equivalent) to be bonded using the thermo-sonic or equivalent wire ball bonding process because the wire bonds to these electrodes may not be reliable over the long term.

A thermistor element using two layers of thin film electrodes have been described in the prior art (U.S. Pat. No.

4,712,085). Other prior art (U.S. Pat. No. 6,008,717) describes a thermistor with a pair of electrodes in a shorter inner electrode and a longer inner electrode are mutually opposite each other and separated by a gap. However, this prior art does not solve the leaching problem described.

SUMMARY OF THE INVENTION

Based on the above, it is an object of the present invention to provide a a cost effective thermistor with electrodes having a high degree of solder leach resistance and able to withstand soldering processes operating at temperatures typically between 200° C. and 380° C. with dwell times typically between 5 seconds and 3 minutes.

Another object of the present invention is to provide for the manufacture of a thermistor with leach resistant electrodes that allow for use of higher temperature solders or low fire conductive compositions to attach leads, thereby increasing the maximum operating temperature capability over that achieved in the prior art.

These and other objects are achieved by the present invention directed to a thermistor having a semiconductor body with a first electrode layer deposited outward from opposite surfaces of the semiconductor body. The first layer, having a thickness of not less than about 5 micrometers, is formed from an electrode material which may be any suitable conductive metal. The second layer is deposited outward from the first layer and has a thickness of not more than about 5 micrometers. The second layer is formed from an electrode material which may be any "reactive metal". The third electrode layer is deposited outward of said second layer and has a thickness of preferably not more than about 5 micrometers. The third electrode layer is formed from electrode material which may be any "barrier" metal. The fourth layer, which is optional depending on the electrical contacts to be bonded thereto, is formed from an electrode material compatible with the electrical contact and/or means for bonding thereto, outward of the third layer and preferably have a thickness of not more than about 5 micrometers. Each of the layers are in electrical contact with the other layers and the semiconductor body.

For the purposes of this disclosure, metals are considered to be any metal, combination of metals or metal alloys. "Reactive" metals are considered to be metals, including any combination or alloy, that react at some level with an adjacent metal to provide improved bonding. "Barrier" metals are considered to be metals, including any combination or alloy, that resists leaching, i.e. migration of the metal into the solder under high temperature conditions, making them suitable for high temperature soldering processes thereby preventing degradation of the layers beneath.

The present invention can be used with any type semiconductors derived from any suitable processes known in the art including but not limited to disc, rod, chip and flake semiconductors. The present invention applies to PTC or NTC semiconductors.

The method for manufacture of the thermistors of this invention include applying the first layer to the semiconductor body by any known means. The subsequent layers are then deposited outward of the first layer so that the reactive layer is outward of the first layer and the barrier layer is outward of the reactive layer. If the electrical contacts can be bonded to the barrier layer no additional layer is contemplated. However, if the contact is not compatible with the barrier metal, an optional fourth layer is applied over the barrier layer. The choice of metals depends on the type of die and/or wire bonding materials to be used for attaching the thermistor.

As a result of the leach resistant properties imparted by the present invention, the thermistor demonstrates much greater stability and reliability both during and after the soldering process used for attaching said thermistor to substrates than that achieved with prior art. For example, a thermistor element of the present invention soldered to an electrical contact under the same conditions and using the same die and/or wire bonding techniques and processes as previously described for the prior art showed resistance shifts of less than 1% as compared to 6% to 20% for a thermistor of the prior art with thick film Au electrodes.

DRAWINGS

The following drawings, in which like reference characters represent like parts, are intended only to illustrate one or more of the preferred embodiments of the present invention without limiting the invention in any manner whatsoever.

FIG. 1b is a cross-sectional elevational view of the thermistor element of FIG 1a.

FIG. 2b is a cross-sectional elevational view of the thermistor element of FIG. 2a.

FIG. 3b is a cross-sectional elevational of the thermistor element of FIG. 3a.

FIG. 4b is a cross-sectional elevational view of the thermistor of FIG. 4a.

FIG. 5b is an enlarged partial cross-sectional view of a top corner of the thermistor of FIG. 5a.

FIG. 5d is a right side perspective view of the thermistor of FIG. 5a.

DETAILED DESCRIPTION OF THE INVENTION

Figure 1A:
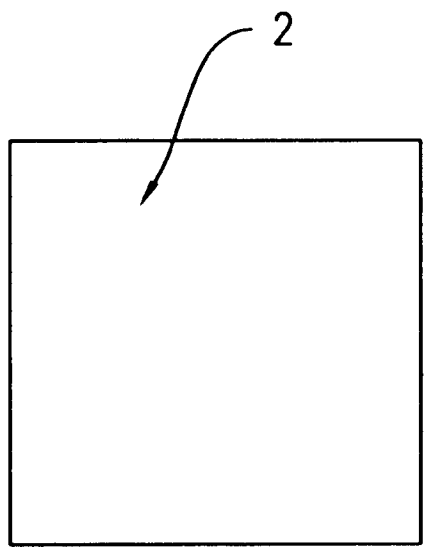
FIG. 1a is a plan view of a thermistor element of the prior art.
Figure 1B:
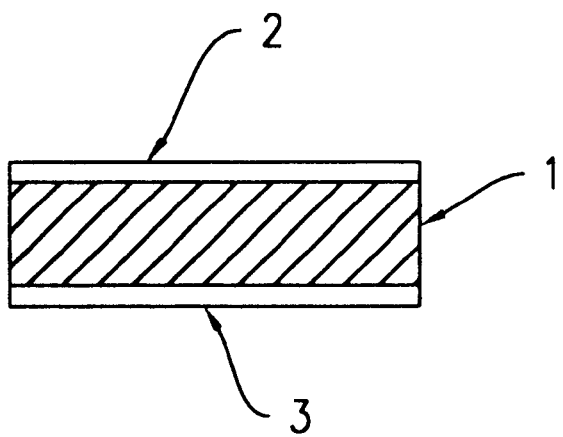
Figure 2A:
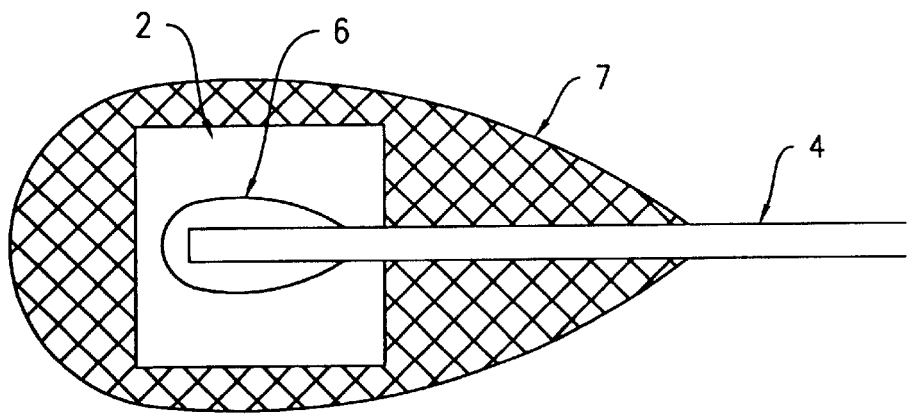
FIG. 2a is a cross-sectional plan view of a thermistor element of a second configuration of the prior art.
Figure 2B:
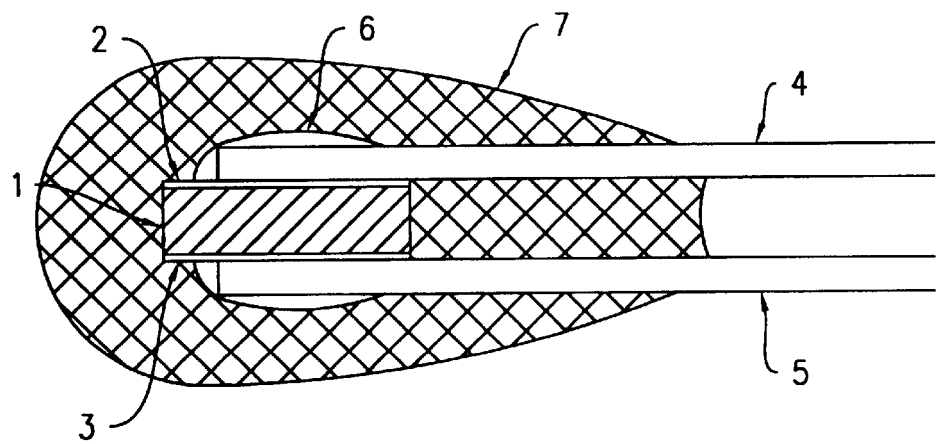
Figure 3A:
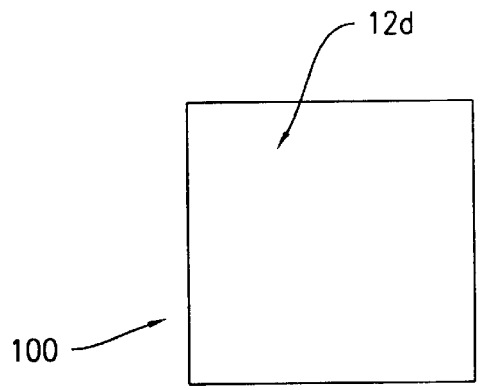
FIG. 3a is a plan view of a thermistor element of a preferred embodiment of the present invention.
Figure 3B:
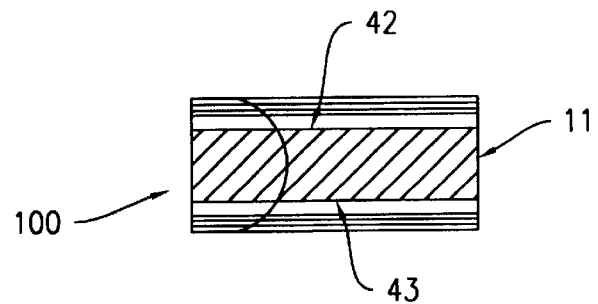
Figure 3C:
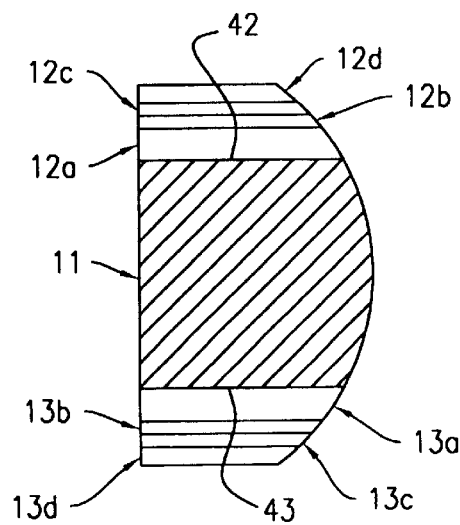
FIG. 3c is an enlarged partial cross-section of the thermistor element of FIG. 3b.

As shown in the drawings, and particularly FIGS. 3a–c, the preferred embodiment of the invention is comprised of a ceramic semiconductor body (11), comprising opposed sides (42 and 43), including one or more metal oxides. A first layer of metal electrode material comprising a conductive metal (12a and 13a) having a thickness of not less than 5 micrometers is deposited on each side of said opposed sides (42 and 43). On the first layer (12a and 13a) is deposited a second layer of metal electrode material (12b and 13b) followed by a third layer of metal electrode material (12c and 13c) on the second layer (12b and 13b). Optionally, a fourth layer of metal electrode material (12d and 13d) is deposited on the third layer (12c and 13c).

An electrical contact is attached to the outer electrode layer on the semiconductor body for application of the present thermistor. This electrical contact and the means for bonding to the outer thermistor electrode layer determines whether to use the fourth layer (12d and 13d) and the composition of the fourth layer.

The thermistor (100) of the present invention can be formed from any suitable semiconductor body, preferably being a ceramic semiconductor.

There are many different ways to produce semiconductor bodies for thermistors. As long as proper ceramic processing techniques are used, this invention can apply to semiconductor bodies made from any method known in the art, such as tape casting, pressing, extrusion, injection molding or other suitable method. The semiconductor body (11) can be a flake, disc, rod, chip or any suitable variety or shape.

The first layer of metal electrode material (12a) (13a) may be any suitable conductive metal or alloy. Preferably Ag, Pt, Pd, Au, or any combination thereof, combined with a glass frit or fritless binder is used as the first layer material. The first layer (12a and 13a) is preferably applied to the wafer (11) by spraying. It may, however, be applied by screening, painting, brushing, spin coating, dipping or other means known or later developed. The thickness of the first layer is not less than about 5 micrometers (1 micrometer=$10^{-6}$ m), preferably from about 10 to 40 micrometers, and most preferably 25 micrometers. Therefore, it is considered a "thick" film layer.

The second electrode layer (12b and 13b) is most preferably deposited on the first thick layer (12a and 12b) by any suitable technique such as electroplating or vapor deposition, with physical vapor deposition (PVD) being most preferred. The second electrode material may be any "reactive" metal such as Ti, V, Cr, Zr, Nb, or Tc that does not form a brittle intermetallic interface with the thick film base electrode. The second (12b and 13b), as well as the third (12c and 13c) and optional fourth layers (12d and 13d), are greater than 0.01 micrometers and less than about 5 micrometers. Thus, the preferred additional layers are considered "thin" film layers.

For this invention, the preferred second layer metal is Ti. Ti is deposited over the thick film Ag layer (12a and 12b) because of its cost effectiveness and its "reactive" characteristic, i.e. its suitability for bonding to thick film Ag and several other metals. The preferred thickness for this second layer (12a and 13a) is about 0.05 to about 1 micrometer.

The third electrode layer (12c and 13c) is deposited on the second layer (12b and 13b) by PVD of any barrier metal such as Pt, Pd, Re, W, Ni or Mo. For this invention, Pt is the preferred third layer because it does not oxidize under high temperature soldering conditions, making it suitable for high temperature soldering processes. The third layer (12c and 13c) is the key "barrier" metal that prevents leaching of the electrode layers underneath it. The preferred thickness of this third layer (12c and 13c) is from about 0.1 to about 1.5 micrometers.

The optional fourth electrode layer (12d and 13d) is deposited on the third layer (12c and 13c) by PVD and consists of a fourth electrode material which may be any metal which is compatible with the metal of an electrical contact to be bonded thereto. The choice of the metal depends on the type of materials used in the die bonding (shown in FIGS. 5a–e) and/or wire bonding (shown in FIGS. 4a–c) means used for attaching the thermistor element. For the most preferred embodiment of this invention, Au is the preferred fourth thin film layer material. Au is preferred because the applications for which this thermistor element was designed require a non-oxidizable Au surface to which the solder and gold wire can bond with a high degree of reliability. The preferred thickness of this fourth layer (12d and 13d) is from about 0.5 to about 2.5 micrometers.

Figure 4A:
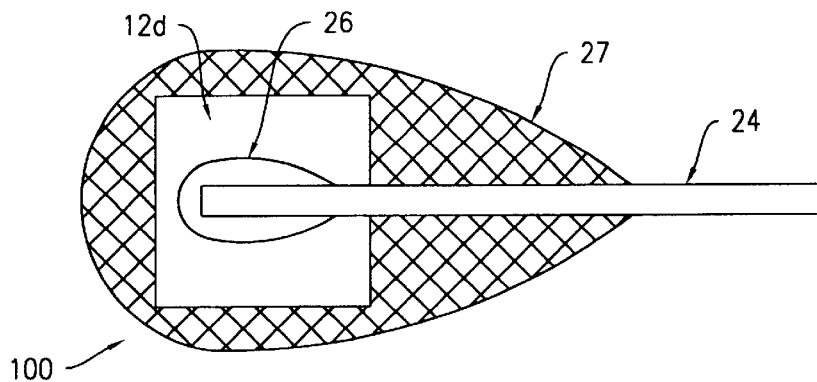
FIG. 4a is a cross-sectional plan view of a thermistor utilizing the preferred embodiment of the thermistor element of FIGS. 3a–c.
Figure 4B:
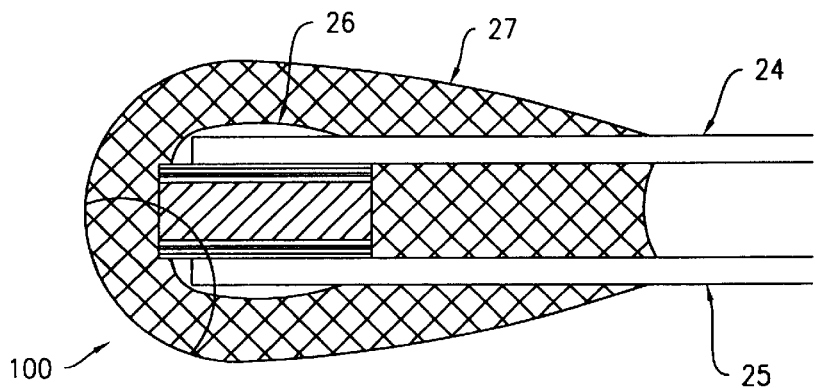
Figure 4C:
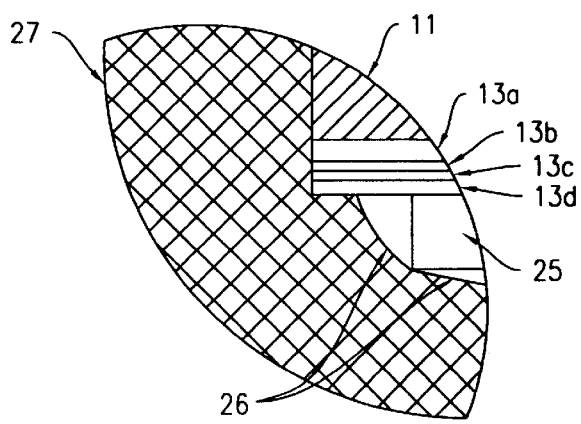
FIG. 4c is an enlarged partial cross-section of the thermistor element of FIG. 4b.
Figure 5A:
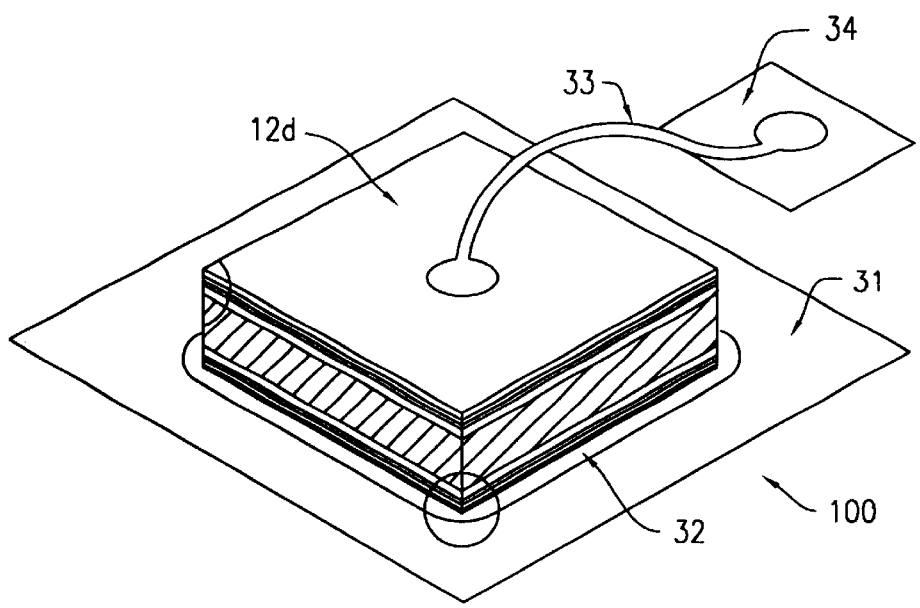
FIG. 5a is a perspective view of an alternative thermistor of the present invention illustrating a solder bond between the bottom electrode of the thermistor element and a contact pad of an electric circuit substrate.
Figure 5B:
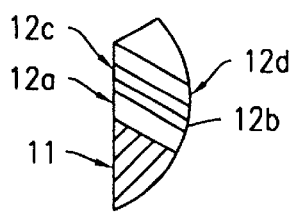
Figure 5C:
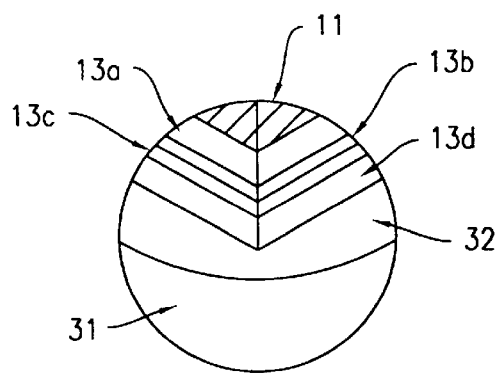
FIG. 5c is an enlarged partial cross-sectional view of the thermistor element of FIG. 5b.
Figure 5D:
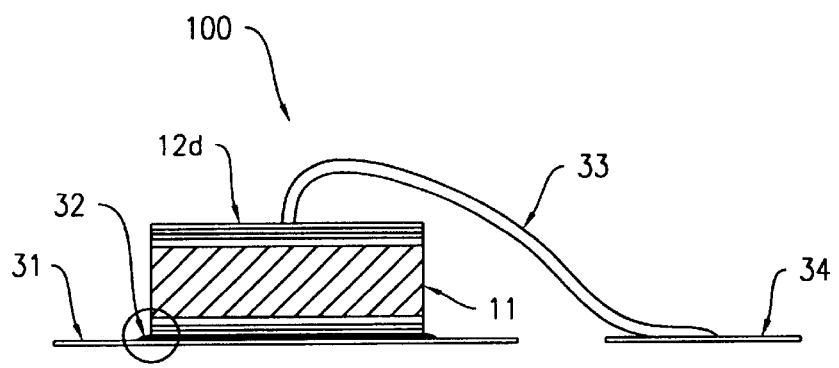
Figure 5E:
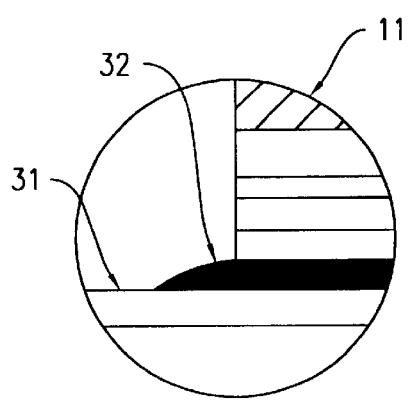
FIG. 5e is an enlarged partial cross-sectional view of the thermistor element of FIG. 5d.

FIGS. 4a–c and 5a–e contain the same thermistor element (100) represented in FIGS. 3a–c with discrete component and surface mount wire bond/die bond component configurations, respectively. Referring to FIGS. 4a–c, the electrical contacts are in the form of wire leads (24 and 25) made of a material suitable for the maximum operating temperature defined by the application for which the thermistor is to be used. For example, such lead material can be Ag plated Cu, Ag plated Ni, Ag plated Cu/Ni alloy, or AU plated Dumet (Fe—Ni core coated with copper). Solder (26) covers the wire leads which can be SN10, SN95, or SN96. For higher temperature applications, other bonding materials such as low-fire (typically 500° C.) conductive composition can be used.

An insulating coating material (27), which can be a high temperature epoxy or low fire (typically 500° C.) glass, depending on the choice of bonding materials and leads, may be used to coat the surface of the thermistor. For example, the combination used in this invention was Ag plated Cu leads bonded with SN96 solder and coated with a high temperature epoxy. Another combination could be Ag plated Ni leads bonded with SN10 solder and coated with high temperature epoxy. Similarly, another combination could be Au plated Dumet leads bonded with low-fire conductive composition and coated with low-fire glass. All such combinations, as well as any others, known or later developed, are intended to be covered by the present invention.

FIGS. 5a–e illustrate the configuration for mounting to a hybrid microelectronic circuit substrate. The thermistor (100) is mounted onto a substrate contact or pad (31) by using soldering processes and solder (32) described previously. A 0.001" OD gold wire (33) is bonded to the outer layer (12d) of the top electrode of the thermistor (100) and to another substrate pad (34) using thermo-sonic compression or equivalent wire ball bonding method.

The manufacture of the thermistor (100) of the present invention begins with providing a suitable semiconductor for the desired application. Any semiconductor body, generally produced from a wafer or group of wafers composed of sintered ceramic thermistor material known to be suitable in the art, may be used in this invention. These wafers are preferably disc shaped (typically 30 mm to 50 mm OD, 0.08 to 0.4 mm thick) or square shaped (typically 50 mm squared×0.08 to 0.4 mm thick). The wafers can be larger or smaller in surface are and/or greater in thickness, depending on the processes used for application of the electrodes. Wafers that are thinner can be used, but handling throughout the rest of the process becomes more difficult.

Wafers found to be suitable for the present invention are composed of the oxides of Mn, Ni, and Fe and are approximately 50 mm square. Three thicknesses were chosen—approximately 0.08 mm, 0.2 mm, and 0.3 mm—for the purpose of producing thermistor elements of three different sizes and/or resistance values. NTC or PTC semiconductors may be used with the present invention.

The type of wafer with the most test data is the 0.08 mm thick wafer, which was used to produce relatively small thermistor elements (approximately 0.40 to 0.44 mm square) with a nominal electrical resistance of 10,000 ohms at 25° C., designed to meet the requirements of hybrid microcircuit applications. These hybrid microcircuit requirements range from MIL Specs such as MIL-STD-883 and MIL-G-45204 to simple commercial specifications defined by the microcircuit manufacturer and/or packager and anywhere in between.

There is presently a practical physical limitation to handling wafers that are thinner than 0.08 mm and chips that are much smaller than 0.44 mm square. However, if the technology improves to accommodate smaller sizes derived from thinner wafers, this invention will still apply. Moreover, the shape or configuration (e.g. square, rectangle, or disc) of the final thermistor element will not have an effect on this invention, as long as the element is formed with the semiconductor material in the middle and the electrodes being formed on opposite sides.

Once the wafer used to create the semiconductor body (11) is provided, a thick film Ag conductive composition containing a glass frit or fritless binder known to be suitable in the art for bonding to the semiconductor material is then applied by spraying onto both sides of the wafer and dried. Of course, other methods of applying the thick film Ag layer know to be suitable or hereinafter developed in the art may be used, including, but not limited to, screen printing, brushing, spin coating, dipping or other equivalent processes.

The wafers with the first metal layer (12a and 12b) are then fired in a furnace to bond the thick film Ag material (FIG. 3b, FIG. 4b, and FIG. 5—(12a) and (13a)) to the semiconductor wafer. The fired thick film Ag layer (12a and 12b) on each side is preferably approximately 25 micrometers thick, but a thickness range of 10 micrometers to 40 micrometers is acceptable.

Immediately after coming out of the furnace, the wafers having the first electrode layer thereon are carefully wrapped in aluminum foil and placed in a desiccator, which is pumped down to a vacuum of approximately 20" of Hg to prevent the formation of sulfates, other air-born contaminants, including dust particles on the surface of the thick film Ag layers. Such surface contamination on the thick film Ag electrodes (12a and 13a) would cause poor adhesion and surface defects in the subsequent thin film layers that are deposited. Therefore, the wafers with fired-on thick film Ag electrodes are stored in the desiccator until the next process step, called physical vapor deposition (PVD), is initiated.

The wafers having the first layer thereon are removed from the desiccator placed into the PVD apparatus that deposits thin films of metals to both sides. Any PVD process or other process known to be suitable in the art for thin film deposition can be used. For this example, the following metals and their respective thicknesses were applied sequentially by PVD in the following order: Ti—0.15 micrometers; Pt—0.5 micrometers; Au—1.50 micrometers. The PVD machine is able to hold a tolerance of ±10% of the nominal thickness for each layer deposited.

Below is a list of generally acceptable alternative metals and their corresponding approximate thickness that can be deposited by PVD onto the wafers in the following order:

Second ("reactive") metal layer (12b and 13b)—Ti, V, Cr, Zr, Nb, Tc or combinations and alloys—0.05 to 1.0 and preferably 0.1 to 0.3 micrometers, depending on the metal.

Third ("barrier") metal layer (12c and 13c)—Pt, Pd, Re, W, Ni, Mo or combinations and alloys—0.05 to 2.0 and preferably 0.3 to 0.7 micrometers, depending on the metal.

Fourth optional metal layer (12d and 13d)—appropriate bonding metal—0.3 to 5.0 and preferably 1.0 to 3.0 micrometers, depending on the metal and electrical contact.

The wafers of 0.08 mm sintered thickness with thick film Ag layer (12a and 13a) thin film Ti layer (12b and 13b), Pt layer (12c and 13c) and Au layer (12d and 13d) were mounted in sheet form onto a 4"×4" ceramic tile using a no-load mounting cement designed for holding ceramic materials to be machined.

The mounted thermistor sheets according to this invention were diced using a saw with a diamond blade, designed for dicing thermistor wafers into chips (as shown in FIG. 3) approximately 0.44 mm square to produce a thermistor element (100) with a resistance value (R value) of 10,000 ohms at 25° C. The feed rate of the dicing saw table was approximately 40 inches per minute. The feed rate can be slower, but should not be much faster in order to minimize edge burrs on the thermistor elements (100).

Alternative methods of dicing a wafer having the described electrode layers into thermistor elements (100) are known to be suitable in the art, including but not limited to laser dicing and stamping with ultrasonic milling techniques, can be used. Thermistor elements (100) can be made into other shapes, such as rectangles or discs. Thermistor elements (100) can be made into other sizes, ranging from 0.4 mm to 2 mm OD or greater for discs and 0.4 mm to 2 mm or greater for squares and rectangles, depending on the desired end product for which the element is designed.

Of course, changes, variations, and modifications to the present invention may make themselves obvious to those skilled in the art in light of the above. For example, additional conductive layers may be used between the wafer and the first electrode layer, between the first and second electrode layer, etc. as long as electrical conductivity is maintained through the layers. However, all such variations are intended to fall within the spirit and scope of the present invention, limited only by the appended claims.

What is claimed is:

1. A method of manufacturing a thermistor comprising of the steps of:

(a) forming a semiconductor body having opposed sides;

(b) depositing a first electrode layer on at least a portion of each said opposed sides of said semiconductor body by a thick film deposition method, said first electrode layer comprising a conductive metal and having a thickness of from about 10 to about 40 micrometers;

(c) depositing a second electrode layer on said first electrode layer, said second electrode layer comprising titanium and having a thickness of from about 0.05 to about 1.0 micrometer;

(d) depositing a third electrode layer on said second electrode layer, said third electrode layer comprising platinum and having a thickness of from about 0.05 to about 2.0 micrometers; and (e) optionally, depositing a fourth electrode layer on said third electrode layer, said fourth electrode layer having a thickness of from about 0.3 to about 5.0 micrometers.

2. The method of claim 1 further comprising the step of attaching an electrical contact to and outer electrode layer on each of said opposed sides.

3. The method of claim 2 wherein the electrical contacts are attached to the outer layer by soldering, welding, conductive adhesives or wire bonding.

4. The method of claim 1 wherein the thick film deposition method of depositing the first layer is taken from the group consisting of spraying, screen-printing, brushing or spin coating.

5. The method of claim 4 wherein the thick film deposition method of depositing the first layer is spraying.

6. The method of claim 1 wherein the second, third and optional fourth layers are deposited by vapor deposition or electroplating.

7. The method of claim 1 further comprising the step of selecting an outer layer based on the composition of the electrical contact to be attached thereto.

8. The method of claim 1 wherein the conductive metal of the first electrode layer is taken from the group consisting of silver, platinum, palladium, gold, alloys and combinations thereof.

9. A method of manufacturing a thermistor consisting essentially of the steps of:

(a) forming a semiconductor body having opposed sides;

(b) depositing a first electrode layer on at least a portion of each said opposed sides of said semiconductor body by a thick film deposition method, said first electrode layer comprising a conductive metal and having a thickness of from about 10 to about 40 micrometers;

(c) depositing a second electrode layer on said first electrode layer, said second electrode layer comprising titanium and having a thickness of from about 0.05 to about 1.0 micrometer;

(d) depositing a third electrode layer on said second electrode layer, said third electrode layer comprising platinum and having a thickness of from about 0.05 to about 2.0 micrometers; and (e) optionally, depositing a fourth electrode layer on said third electrode layer, said fourth electrode layer having a thickness of from about 0.3 to about 5.0 micrometers.

10. The method of claim 9 wherein the conductive metal of the first electrode layer is taken from the group consisting of silver, platinum, palladium, gold, alloys and combinations thereof.

* * * * *

UNITED STATES PATENT AND TRADEMARK OFFICE
CERTIFICATE OF CORRECTION

PATENT NO.    : 6,660,554 B2
DATED         : December 9, 2003
INVENTOR(S)   : Gregg J. Lavenuta It is certified that error appears in the above-identified patent and that said Letters Patent is hereby corrected as shown below:

Column 8,
Line 63, "and" should read -- an --.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO.    : 6,660,554 B2
DATED         : December 9, 2003
INVENTOR(S)   : Gregg J. Lavenuta It is certified that error appears in the above-identified patent and that said Letters Patent is hereby corrected as shown below:

Title page,
Item [73], add in -- [73] Assignee: Cornerstone Sensors, Inc., Vista, CA --

Signed and Sealed this

Twenty-sixth Day of July, 2005

JON W. DUDAS
*Director of the United States Patent and Trademark Office*